March 25, 1930.  D. C. COX  1,752,238
PROCESS OF RECLAIMING OIL
Filed March 18, 1925
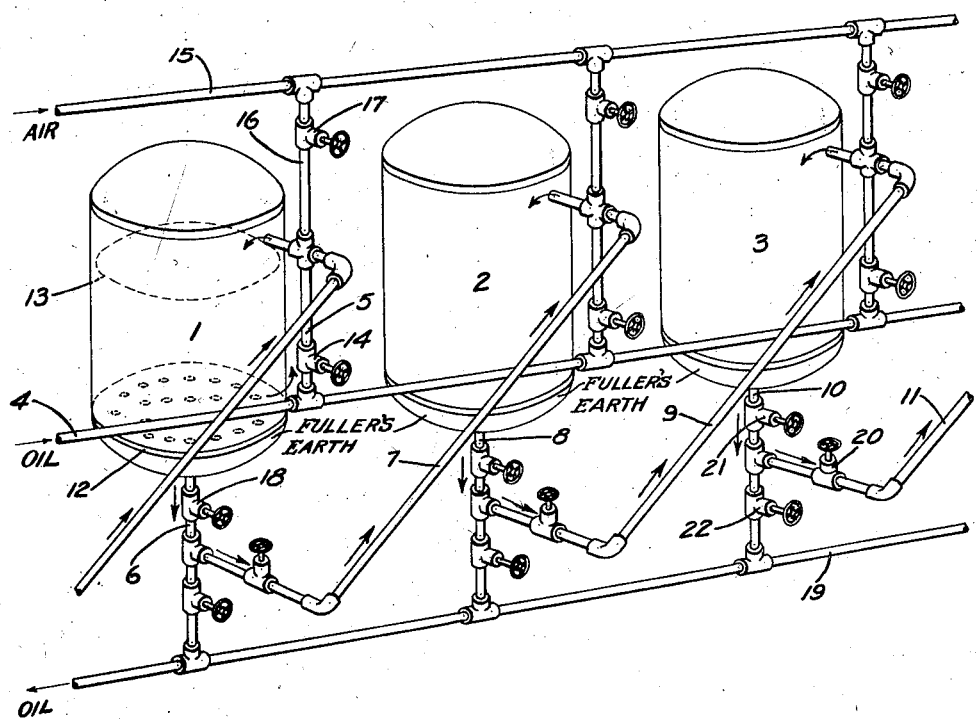
Inventor:
David C. Cox,
by *Alexander S. Lunt*
His Attorney.

Patented Mar. 25, 1930

1,752,238

UNITED STATES PATENT OFFICE

DAVID C. COX, OF PITTSFIELD, MASSACHUSETTS, ASSIGNOR TO GENERAL ELECTRIC COMPANY, A CORPORATION OF NEW YORK

PROCESS OF RECLAIMING OIL

Application filed March 18, 1925. Serial No. 16,554.

When mineral oil is heated for protracted periods, a black sludge or precipitate is formed therein which is less fluid than the oil and even is semi-solid. The chemical reactions giving rise to this sludge are not entirely understood but are known to include primarily the reaction of certain constituents of the oil with atmospheric oxygen. The sludge formed in oil used in electrical apparatus is deleterious because of its corrosive effect on metals and its tendency to clog the circulatory cooling system in such apparatus as transformers.

It is the object of my invention to reclaim or render suitable for further use mineral insulating oil which has become unfit for service by reason of sludge formed therein. Mere removal of the sludge is not sufficient to render the oil fit for further service as it will quickly become sludged again.

It has been proposed to pass the used oil through the entire schedule of chemical treatment given crude oil during refining, and including alternate acid and alkali treatment, washing, filtration and so forth. Even if such a procedure would successfully restore the original properties in the oil, the losses of oil and the cost entailed would make such a recovery impracticable.

I have found that when a sludge-containing oil is passed through an adsorptive material, such as fuller's earth, without the chemical treatment usually given crude oil in refining processes, that the sludge is removed completely.

In accordance with another feature of my invention the clarified oil is rendered capable of use without premature sludging by adding to the clarified used oil, an agent which retards the precipitation of sludge.

The accompanying drawing illustrates a filtering apparatus suitable for carrying out my invention.

As shown in the drawing the oil to be purified, for example, sludged oil from a transformer, is passed in succession through a series of tanks only three of which, numbered 1, 2 and 3, have been shown. These tanks are arranged to permit their connection and operation in series, the oil flowing from the bottom of one tank into the top of the next and so on through the series. The tanks may be each disconnected to remove spent filtering agent and to recharge the emptied tank with a new supply, the remaining tanks being kept in service in the meantime. For example, the sludged oil may be received through a conduit 4 and passed through the pipes 5, into the tank 1 and from thence by the pipes 6, 7 into the tank 2, from which in turn it passes by the pipes 8, 9 into the tank 3. From the tank 3 the oil may go on to succeeding filtering tanks through the pipes 10 and 11, but only three tanks have been shown on the drawing for the sake of simplicity. To avoid any of the fuller's earth passing over with the oil, and also to avoid formation of channels in the fuller's earth, the latter is supported on a perforated plate 12, a suitable fabric preferably being interposed between the fuller's earth and the plate 12. A second fabric indicated by a dotted line at 13 is placed upon the top of the fuller's earth, the oil flowing through the upper fabric through the fuller's earth and through the perforated plate 12. It is collected in the hemispherical bottom of the tank from which it is tapped off by the pipe 6 as indicated.

If it is desired to remove the fouled filtering medium from any of the tanks, for example, from tank 1, then the valve 14 is closed and the oil in the filtering medium is forced out by compressed air received from a pipe 15 which communicates through a branch pipe 16 with the top of the filtering tank. By opening the valve 17 in the pipe 16 compressed air may be admitted on the top of the tank which forces out the oil from the fuller's earth or the like contained in the tank.

If desired, the process of removing the oil which saturates the filtering medium may be hastened by providing a separate discharge pipe (not shown). In that case the valve 18 in the pipe 6 is closed before the compressed air is forced through the filtering medium.

While the tank 1 is being cleaned, the sludged oil passes on to the second tank through the conduit 4 and this tank becomes the first one of the series. Whichever tank is the last of the series discharges the filtered oil into a discharge pipe 19. For example, if tank 3 is the last of the series, the valve 20 in the pipe 11 is closed and the valves 21 and 22 are opened thereby permitting the oil to discharge through the pipe 19. The tank most recently charged with filtering medium preferably is made the last of the series.

Preferably about eight tanks, each containing a filtering bed about 40 inches in height are used as described above for removing the sludge from the oil. Not only fuller's earth but any material having the property of adsorbing sludge, for example, silica or charcoal, can be used as a filtering medium. Either the formation of sludge in the oil or the filtration, and perhaps both processes, remove from the oil some agent which gives the oil the property of retaining either in solution, or in the state of suspension, the sludge which is formed during the use of the oil. In other words some ingredient is present in oil as received from the refinery which delays the precipitation of sludge as a harmful ingredient. This substance has not yet been isolated from the oil. Such an ingredient which delays the formation of a sludge I have termed herein as an anti-coagulator. I find sufficient excess of anti-coagulator is contained in new oil as it is produced by the ordinary refining process to permit the new oil to be mixed with a preponderant amount of reclaimed oil without loss of effectiveness of the anti-coagulating agent in the mixture. For example, I have found that a mixture of 35 parts unused oil and 65 parts of reclaimed oil from which sludge has been removed in accordance with the above described filtration process can be used at high temperatures in a transformer for the same length of time as the oil produced by the refining process before sludge is formed therein.

What I claim as new and desire to secure by Letters Patent of the United States is:—

1. The process of reconditioning a mineral insulating oil after use at a temperature sufficiently high to produce sludge therein which consists in conducting said oil through a bed of absorptive material and adding thereto a sufficent quantity of new mineral insulating oil to form an insulating oil mixture which is capable of being used under substantially the same conditions as the original oil before being sludged.

2. The process of reclaiming mineral transformer oil in which oxidation products formed at elevated temperature have been precipitated which consists in filtering the oil through an adsorptive agent which is capable of removing materials held in suspension and adding to the oil a substantial quantity of unused oil before continuing the use of the filtered oil in a transformer.

3. The process of reclaiming sludge-containing mineral oil after use at elevated temperatures in an electric transformer which consists in removing the sludge from said oil and adding to said oil about one-half its bulk of new oil to form a mixture which is capable of being used under substantially the same conditions as new oil before sludge is precipitated therein.

4. The process of reclaiming mineral oil in which a sludge has formed by use at high temperature in an electrical device which consists in removing said sludge by filtration of said oil through fuller's earth and then adding to said filtered oil new oil containing sufficient anti-coagulator to permit use of the mixture for a substantial period of time without the precipitation of sludge.

5. The process of reclaiming mineral oil in which a sludge formed by use at high temperature has been precipitated which consists in removing said sludge by filtration of said oil through fuller's earth and mixing with about 65 parts of said filtered oil about 35 parts of unused oil of the same general character.

In witness whereof I have hereunto set my hand this sixteenth day of March, 1925.

DAVID C. COX.